United States Patent
Yokoyama

(10) Patent No.: US 10,991,941 B2
(45) Date of Patent: Apr. 27, 2021

(54) METHOD OF PRODUCING A COMPOSITE MATERIAL USED FOR A POSITIVE ELECTRODE OF A LITHIUM ION SECONDARY BATTERY

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/718,722

(22) Filed: Dec. 18, 2019

(65) Prior Publication Data
US 2020/0220164 A1   Jul. 9, 2020

(30) Foreign Application Priority Data
Jan. 9, 2019   (JP) .............................. JP2019-001573

(51) Int. Cl.
| | |
|---|---|
| *H01M 4/36* | (2006.01) |
| *H01M 4/58* | (2010.01) |
| *H01M 10/0525* | (2010.01) |
| *H01M 4/02* | (2006.01) |

(52) U.S. Cl.
CPC ......... *H01M 4/366* (2013.01); *H01M 4/5825* (2013.01); *H01M 10/0525* (2013.01); *H01M 2004/028* (2013.01)

(58) Field of Classification Search
USPC ........................................... 427/58, 115, 212
See application file for complete search history.

(56) References Cited

U.S. PATENT DOCUMENTS

| | | | |
|---|---|---|---|
| 2008/0003504 A1* | 1/2008 | Cho ................... | H01M 10/0525 429/231.95 |
| 2013/0219703 A1* | 8/2013 | Mitsuhashi ............. | H01M 4/13 29/623.5 |
| 2014/0106222 A1* | 4/2014 | Park ...................... | H01M 4/483 429/219 |
| 2014/0162132 A1 | 6/2014 | Ishii et al. | |

(Continued)

FOREIGN PATENT DOCUMENTS

| | | |
|---|---|---|
| JP | 2014-116111 A | 6/2014 |
| JP | 2016-051566 A | 4/2016 |
| JP | 2018-063756 A | 4/2018 |

*Primary Examiner* — Brian K Talbot

(74) *Attorney, Agent, or Firm* — Oliff PLC

(57) ABSTRACT

A method of producing a composite material for a lithium ion secondary battery disclosed here includes a step of preparing a mixture which contains a positive electrode active material and an inorganic phosphorus compound constituting a composite material and in which the solid content is 90 mass % or higher (a mixture preparing step S10); and a step in which the mixture is stirred at a predetermined stirring rate or higher, and a coating made of lithium phosphate from at least a part of a lithium compound present on the surface of the positive electrode active material and the inorganic phosphorus compound is formed on the surface of the positive electrode active material (a coating forming step S20). Here, the composite material includes the positive electrode active material and the coating formed on the surface of the positive electrode active material.

12 Claims, 2 Drawing Sheets

(56) References Cited

U.S. PATENT DOCUMENTS

| | | | |
|---|---|---|---|
| 2014/0199475 A1* | 7/2014 | Tonegawa | H01M 4/5825 427/122 |
| 2015/0228973 A1* | 8/2015 | Won | H01M 4/5825 429/220 |
| 2016/0126542 A1* | 5/2016 | Han | H01M 4/582 429/223 |
| 2016/0293951 A1* | 10/2016 | Lim | H01M 4/366 |
| 2016/0351898 A1* | 12/2016 | Fang | H01M 4/5825 |
| 2017/0077502 A1* | 3/2017 | Kishimoto | C01G 53/54 |
| 2018/0090782 A1* | 3/2018 | Choi | H01M 10/052 |

* cited by examiner

FIG. 3A
FIG. 3B
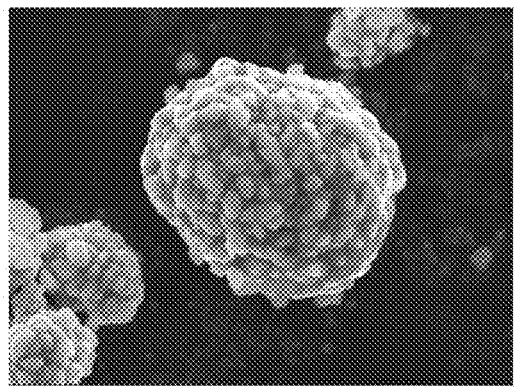
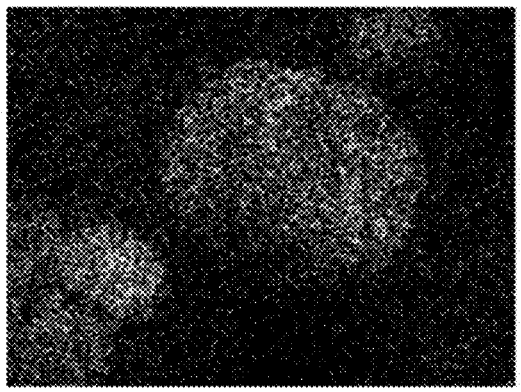
2.5 μm
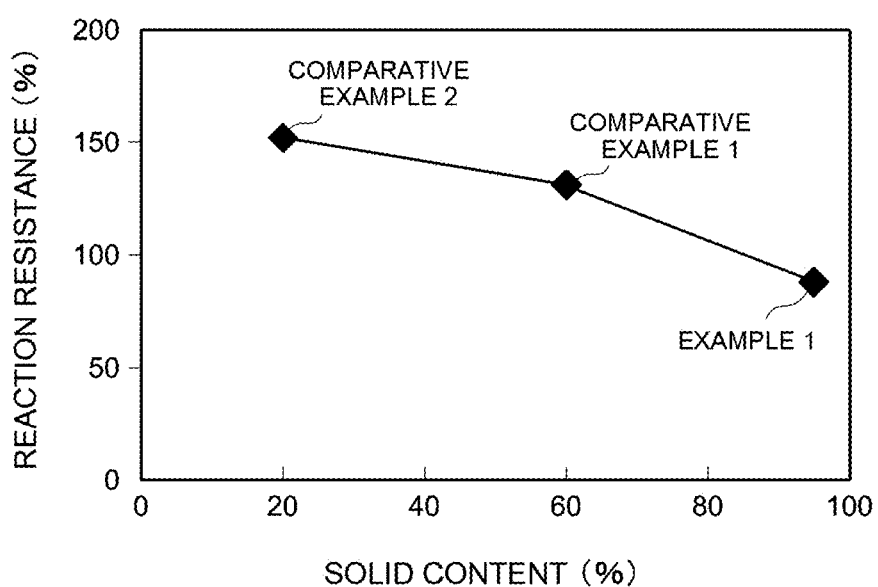
FIG.4

METHOD OF PRODUCING A COMPOSITE MATERIAL USED FOR A POSITIVE ELECTRODE OF A LITHIUM ION SECONDARY BATTERY

CROSS-REFERENCE TO RELATED APPLICATIONS

Priority is claimed on Japanese Patent Application No. 2019-001573, filed Jan. 9, 2019, the content of which is incorporated herein by reference.

BACKGROUND OF THE INVENTION

1. Field of the Invention

The present invention relates to a method of producing a composite material for a lithium ion secondary battery, and particularly, to a method of producing a composite material including a positive electrode active material and a coating formed on the surface of the positive electrode active material.

2. Description of the Related Art

Since lithium ion secondary batteries are lighter and have a higher energy density than conventional batteries, they have recently become increasingly preferable for use in so-called portable power supplies such as in personal computers and mobile terminals and also as a power source for driving a vehicle. Particularly, lithium ion secondary batteries are expected to become increasingly popular as high-output power sources for driving vehicles such as electric vehicles (EV), hybrid vehicles (HV), and plug-in hybrid vehicles (PHV).

Regarding one form of a positive electrode active material used for this type of lithium ion secondary battery, a form in which a coating (including a coating film and a coating layer; hereinafter the same) is formed on the surface of a positive electrode active material constituting a positive electrode active material component has been studied and various objects such as improvement in battery performance have been realized so far.

Specifically, for example, in JP 2014-116111A, a positive electrode active material in which an inorganic layer (coating) made of aluminum oxide ($Al_2O_3$) or the like is formed on the surface of a positive electrode active material is disclosed. When the inorganic layer (coating) is formed, the shape of the surface of the positive electrode active material is modified and increase in resistance is minimized. Thereby, a cycle capacity retention rate of the lithium ion secondary battery including the positive electrode active material is improved.

On the other hand, in JP 2016-51566A, a positive electrode active material in which lithium phosphate (specifically, $Li_{1.3}Al_{0.3}Ti_{1.7}(PO_4)_3$) as a coating is formed on the surface of a positive electrode active material is disclosed. In a lithium ion secondary battery including such a positive electrode active material component, the coating insulates the positive electrode active material from an electrolyte solution, and thereby decomposition of the electrolyte solution due to their contact can be minimized. Thereby, a cycle capacity retention rate of the lithium ion secondary battery and the like are improved.

In addition, lithium phosphate can function as a source for supplying lithium ions in a battery reaction. Therefore, it is known that, in a positive electrode active material component in which lithium phosphate is formed as a coating, lithium ion insertion/removal efficiency can be maintained in a favorable state, that is, increase in interface resistance of the positive electrode active material can be prevented.

SUMMARY

However, regarding a method of forming a coating made of lithium phosphate on the surface of the positive electrode active material, there is still room for improvement in the related art disclosed in the above two items of patent literature.

In JP 2014-116111A, a so-called chemical vapor deposition method is described. In the chemical vapor deposition method, for example, vapor of an element source of a substance constituting a coating is supplied to an active material stepwise and a desired substance (that is, a coating) is formed on the surface of the active material. Therefore, formation efficiency of the coating is low and unevenness in dispersion of the coating is likely to occur on the surface of the active material.

On the other hand, in JP 2016-51566A, a technology in which a desired substance (lithium phosphate) is directly supplied to a positive electrode active material, and a coating is formed on the surface of the positive electrode active material according to a so-called mechanochemical treatment is disclosed. Since lithium phosphate has high crystallinity and is hard, when it is directly supplied to a positive electrode active material, the positive electrode active material may be damaged during the mechanochemical treatment. In addition, lithium ions are not easily released from lithium phosphate crystals. Therefore, when a coating made of crystalline lithium phosphate is formed on the surface of the positive electrode active material, there is a risk of lithium ion insertion/removal efficiency in the positive electrode active material component decreasing and resulting in an increase in interface resistance. This is not preferable because it can cause degradation of the battery performance.

Thus, the present invention provides a method of producing a composite material for a lithium ion battery in which a coating made of lithium phosphate is efficiently formed on the surface of a positive electrode active material and lithium ion insertion/removal efficiency is improved.

The inventor has found that there are lithium compounds (for example, LiOH) other than a lithium transition metal oxide which is the positive electrode active material on the surface of the positive electrode active material. Thus, it has been found that, when a coating made of lithium phosphate is formed on the surface of the positive electrode active material according to this, it is possible to significantly improve the formation efficiency of the coating and the lithium ion insertion/removal efficiency, and thereby completed the present invention.

Specifically, in order to achieve the above object, a method of producing a composite material used for a positive electrode of a lithium ion secondary battery disclosed here includes a step of preparing a mixture which contains a positive electrode active material constituting the composite material and an inorganic phosphorus compound and in which the solid content in the mixture is 90 mass % or larger with respect to 100 mass % of the entire mixture; and a step in which the mixture is stirred at a predetermined stirring rate or higher, and a coating made of lithium phosphate from at least a part of lithium compounds present on the surface of the positive electrode active material and the inorganic phosphorus compound is formed on the surface of the positive electrode active material. Here, the composite material includes the positive electrode active material and the coating formed on the surface of the positive electrode active material.

In the production method including such steps, it is possible to produce a composite material including the positive electrode active material and the coating formed on the surface of the positive electrode active material. In addition, it is possible to provide a lithium ion secondary battery having excellent battery performance using the composite material as a material constituting a positive electrode of a lithium ion secondary battery.

In addition, when the solid content in the mixture is 90 mass % or larger, it is possible to further improve lithium ion insertion/removal efficiency in the composite material.

In addition, in a preferable aspect, the lithium compounds include at least one of $Li_2O$ and LiOH.

Here, the lithium compounds are present on the surface of the positive electrode active material. It is possible to improve formation efficiency of the coating using these lithium compounds.

In addition, in a preferable aspect of the production method disclosed here, inorganic phosphorus compounds include at least one of $H_3PO_4$, pyrophosphoric acid, and $P_2O_5$. In addition, preferably, the mixture contains at least either water or N-methyl-2-pyrrolidone as a solvent.

Accordingly, in the coating forming step, a desired coating can be formed without damage on the surface of the positive electrode active material.

In addition, in a preferable aspect, in the coating forming step, the stirring rate is set to 400 rpm or higher.

When the stirring rate is set to be within this range, suitably, it is possible to prevent the occurrence of unevenness in dispersion of the coating on the surface of the positive electrode active material.

Thus, in a preferable aspect of the production method disclosed here, lithium phosphates include at least one of $Li_3PO_4$, $Li_2HPO_4$ and $LiH_2PO_4$.

In such a configuration, it is possible to produce a composite material in which the lithium ion insertion/removal efficiency is in a high state.

BRIEF DESCRIPTION OF THE DRAWINGS

FIG. 2A is a schematic view showing a part of the surface of the positive electrode active material, the starting material. FIG. 2B is a schematic view showing a part of the surface of the composite material after a coating is formed.

FIGS. 3A and 3B show images obtained by observing the surface of a composite material according to one example (Example 1). FIG. 3A is an SEM image of the composite material. FIG. 3B is an observation image based on EDS of elemental phosphorus present on the surface of the composite material.

FIG. 4 is a graph showing the resistance of three types of sample battery prepared in test examples.

DETAILED DESCRIPTION OF THE PREFERRED EMBODIMENTS

Figure 1:
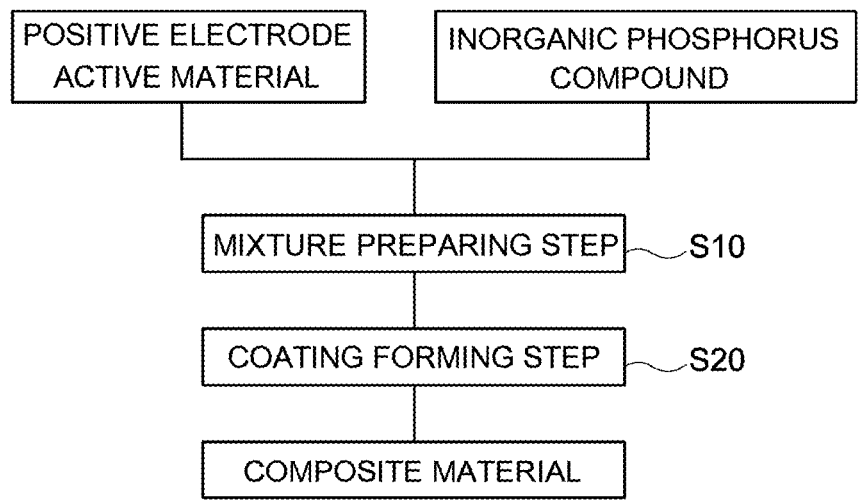
FIG. 1 is a flowchart for producing a composite material according to an embodiment.

An embodiment according to the present invention will be described below with reference to the drawings. Here, in the drawings described below, members and parts exhibiting the same functions are denoted with the same reference numerals and redundant descriptions may be omitted or simplified. In addition, sizes (a length, a width, a thickness, and the like) in the drawings do not reflect actual sizes. In addition, components other than those particularly mentioned in this specification that are necessary for implementing the present invention can be recognized by those skilled in the art as design matters based on the related art in the field.

"Lithium ion secondary battery" in this specification refers to a secondary battery which uses lithium ions as electrolyte ions and is charged or discharged according to movement of lithium ions between positive and negative electrodes, but it has no limitations regarding specific materials (for example, species of a positive electrode active material and a solvent constituting a non-aqueous electrolyte solution), a battery capacity, and a form.

In addition, "positive electrode active material" in this specification refers to a substance (positive electrode active material) that can reversibly occlude and release (typically, insert and remove) a chemical species (specifically, lithium ions) serving as a charge carrier in the lithium ion secondary battery.

As shown in FIG. 1, a method of producing a composite material for a lithium ion secondary battery disclosed here roughly includes a mixture preparing step S10 and a coating forming step S20. The steps will be described below.

First, the mixture preparing step S10 includes a step of preparing a positive electrode active material and an inorganic phosphorus compound as starting materials for making a composite material, and mixing them.

Regarding the positive electrode active material, a lithium-containing compound containing elemental lithium and one or two or more transition metal elements (for example, a lithium transition metal composite oxide) which is a material that can occlude and release lithium ions can be used without particular limitation. Preferable examples include a lithium transition metal oxide having a layered rock salt crystal structure or spinel crystal structure. Examples of such a lithium transition metal oxide include ternary lithium-containing composite oxides such as a lithium nickel composite oxide (for example, $LiNiO_2$), a lithium cobalt composite oxide (for example, $LiCoO_2$), a lithium manganese composite oxide (for example, $LiMn_2O_4$), and a lithium nickel cobalt manganese composite oxide (for example, $LiNi_{1/3}Co_{1/3}Mn_{1/3}O_2$).

In addition, a phosphate containing lithium and a transition metal element as constituent metal elements such as lithium manganese phosphate (for example, $LiMnPO_4$) and lithium iron phosphate (for example, $LiFePO_4$) may be used.

The inorganic phosphorus compound may be any material that can eventually become a phosphorus source for forming a coating made of desired lithium phosphate, and preferable examples thereof include a phosphorus oxide such as diphosphorus pentoxide ($P_2O_5$), and inorganic phosphoric acids such as orthophosphoric acid ($H_3PO_4$) and pyrophosphoric acid ($H_4P_2O_7$). Such an inorganic phosphorus compound can be used alone or two or more thereof can be appropriately used in combination. Such an inorganic phosphorus compound has high reactivity and can become an excellent phosphorus source for forming a coating made of lithium phosphate. In addition, since the compound is softer than a positive electrode active material, it is possible to prevent the positive electrode active material from being damaged in a stirring step to be described below.

An amount of the inorganic phosphorus compound added is not particularly limited, and can be set in various ranges as long as the above object of the present invention can be achieved. For example, an amount of 0.5 mass % or larger and 20 mass % or smaller of the inorganic phosphorus compound is appropriately added, and an amount of 1 mass % or larger and 10 mass % or smaller of the inorganic phosphorus compound is preferably added with respect to 100 mass % of the positive electrode active material.

In order to prepare the mixture, various solvents can be used as necessary. The solvent may be any medium that can disperse starting materials for constituting the composite material, and any of a general aqueous solvent and a non-aqueous solvent (organic solvent) can be used. For example, regarding the aqueous solvent, water or a mixed solvent mainly containing water can be used. Regarding a solvent other than water, which constitutes such a mixed solvent, one or two or more of organic solvents that can be uniformly mixed with water (for example, lower alcohols and lower ketones) can be appropriately selected and used. Regarding the organic solvent (non-aqueous solvent), for example, N-methyl-2-pyrrolidone (NMP) can be particularly preferably used.

When an appropriate solvent is added in the mixture preparing step S10, a solid content in the mixture to be described below can be adjusted to be within an appropriate range. In addition, a solution or suspension of the inorganic phosphorus compound can also be prepared in advance. Thereby, it is possible to improve dispersibility of a solid component in the mixture. For example, when an orthophosphoric acid ($H_3PO_4$) solution with a predetermined concentration or the like is used as the inorganic phosphorus compound, a solvent such as water can be incorporated when the mixture is prepared.

The mixture containing the positive electrode active material and the inorganic phosphorus compound described above can be prepared by adding raw materials all at once into the same container and mixing them. In addition, this step can be performed in multiple steps in a divided manner. Here, during mixing, as necessary, a stirring step may be performed, which can be performed at a desired stirring rate with an appropriate stirring device such as a commercially available mixer.

A solid content in the mixture can be 90 mass % or larger (more preferably 92 mass % or larger, or 94 mass % or larger) with respect to 100 mass % of the entire mixture, or may be substantially 100 mass % (that is, no solvent is used). Main solid components in the mixture are the positive electrode active material and various inorganic phosphorus compounds, and the solid content can be an indicator of the content of the positive electrode active material and various inorganic phosphorus compounds. When the solid content of the mixture is at the above level, the positive electrode active material and the inorganic phosphorus compound in the mixture can be close enough to each other. Thus, in a coating forming step to be described below, it is possible to prevent formation of a coating made of lithium phosphate in a crystal state. That is, the coating can be formed in an amorphous state. Here, when the solid content of the mixture is too small (for example, 60 mass % or smaller), if a large amount of an aqueous solvent is contained as the solvent, there is a risk of the formed coating being crystallized and an amount of lithium ions supplied from the coating that can contribute to the battery reaction being reduced.

Next, the coating forming step S20 is explained. This step is a step in which the mixture obtained in the mixture preparing step S10 is stirred at a predetermined stirring rate or higher, and a coating made of lithium phosphate from at least a part of the lithium compound present on the surface of the positive electrode active material and an inorganic phosphorus compound is formed on the surface of the positive electrode active material.

The mixture can be stirred according to a conventionally known stirring method as long as an energy that is sufficient to form a coating made of lithium phosphate on the surface of the positive electrode active material (for example, mechanical energy generated due to collision, compression, friction, etc.) is applied. For example, methods using known stirring devices (for example, commercially available from Rix Corporation) such as various mixers, blenders, millers, kneaders, and hybridizers may be used. Using such a stirring device, sufficient energy is applied to the positive electrode active material and the inorganic phosphorus compound, and a coating can be uniformly formed on the surface of the positive electrode active material.

The above device performs a stirring step at a stirring rate at which a coating made of lithium phosphate can be formed on the surface of the positive electrode active material. The stirring step is performed preferably at a stirring rate of 400 rpm or higher (preferably 600 rpm or higher, and most preferably 800 rpm or higher). When the stirring rate is set to a rate lower than 400 rpm, there is a risk of unevenness in the dispersion of the coating occurring on the surface of the positive electrode active material. Here, the stirring rate is preferably lower than 2,000 rpm. When the stirring step is performed at a stirring rate of 2,000 rpm or higher, the positive electrode active material may be damaged.

In addition, a stirring duration is not particularly limited, and can be set in various ranges as long as the above object of the present invention can be achieved. For example, the duration is preferably 5 seconds or longer and 5 minutes or shorter (3 minutes or shorter, 1 minute or shorter, or 30 seconds or shorter). When the duration is too short (shorter than 5 seconds), there is a risk of a sufficient coating not being formed. On the other hand, when the duration is too long (longer than 5 minutes), there is a risk of the formed coating peeling off from the positive electrode active material surface.

Figure 2A:
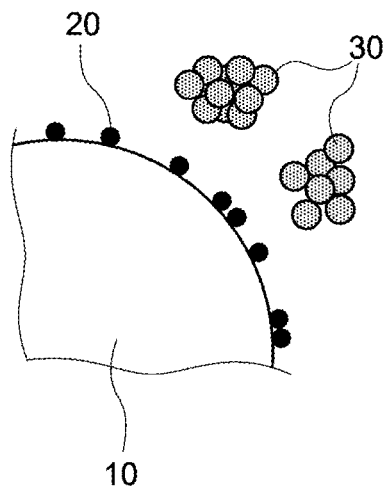
FIGS. 2A and 2B are schematic views of parts of structures of the surfaces of a positive electrode active material, a starting material, and a composite material according to an embodiment.
Figure 2B:
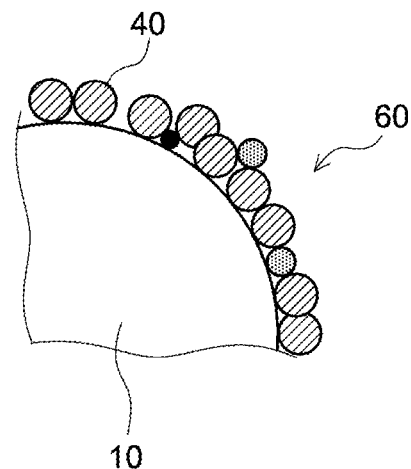

Regarding the lithium compound, a lithium compound present on the surface of the positive electrode active material can be used. Specifically, as shown in FIG. 2A, a lithium compound 20 (for example, lithium oxide ($Li_2O$), and lithium hydroxide (LiOH)) is present on the surface of a positive electrode active material 10. At least a part of the lithium compound reacts with an inorganic phosphorus compound 30 in the mixture according to the stirring step. Therefore, as shown in FIG. 2B, a coating 40 made of lithium phosphates such as $Li_3PO_4$, and $Li_2HPO_4$ and $LiH_2PO_4$ corresponding to intermediates thereof is formed in an amorphous state. Among lithium phosphates, $Li_3PO_4$ can be a particularly excellent lithium ion donor in a battery reaction.

Regarding a preferable aspect of the coating forming step S20, a step in which the mixture obtained as above is stirred at a predetermined stirring rate for a predetermined time, and a new inorganic phosphorus compound is then added, and the stirring step can be performed once or a plural times (for example, twice or three times). Thereby, an additional phosphorus can be supplied to unreacted lithium compound, and formation of a coating made of lithium phosphate can be improved.

In addition, after the coating forming step S20, as necessary, the composite material can be dried. In particular, when an aqueous solvent is used in the mixture preparing step S10, preferably, the aqueous solvent is removed by drying. Specifically, for example, after the coating forming step S20, a drying step can be performed at an appropriate timing according to a conventionally known step (for example, heating and drying, and vacuum drying). When a non-aqueous solvent (such as NMP) is used in the mixture preparing step S10, the drying step can be omitted.

Here, after the coating forming step S20, there is no need to fire the composite material. When a firing treatment is omitted, it is possible to produce a composite material more easily and inexpensively.

Here, it is possible to confirm whether there is a coating 40 formed on the surface of a composite material 60 through analysis according to a general X-ray analysis method. In addition, it may be confirmed by detecting a specific element (for example, elemental phosphorus) present on the surface of the positive electrode active material using an analytical instrument based on energy dispersive X-ray spectroscopy (EDS analysis method).

According to the method of producing a composite material for a lithium ion secondary battery disclosed here, as shown in FIG. 2B, the coating 40 made of lithium phosphate can produce the composite material 60 formed on the surface of the positive electrode active material 10.

In the present invention, since the lithium compound 20 present on the surface of the positive electrode active material 10 is used, lithium phosphate is not directly supplied to the positive electrode active material 10. Thereby, it is possible to prevent the positive electrode active material 10 from being damaged during the stirring step. In addition, it is possible to improve formation efficiency of the coating 40 made of lithium phosphate and it is possible to prevent the occurrence of unevenness in dispersion of the formed coating 40. In addition, when the mixture is prepared under a condition in which a solid content is 90% or larger, crystallization of lithium phosphate is prevented, and the coating 40 is formed in an amorphous state. Thereby, lithium ion insertion/removal efficiency of the composite material 60 is in a high state.

Several test examples related to the present invention will be described below, but the present invention is not intended to be limited to such test examples.

Production of Composite Material

Composite materials according to Example 1, Comparative Example 1, and Comparative Example 2 were produced according to steps described below.

EXAMPLE

A so-called ternary lithium transition metal composite oxide generally used in a lithium ion secondary battery was used as a positive electrode active material, and the following steps were performed to produce a composite material of an example.

Specifically, 200 g of a positive electrode active material was stirred using a commercially available stirring device (hereinafter simply referred to as a "stirring device") at a stirring rate of 800 rpm for about 5 seconds and dispersed. Next, while adding 5 g of a 5 M $H_3PO_4$ aqueous solution to the positive electrode active material, stirring was performed at a stirring rate of 800 rpm for 10 to 15 seconds to prepare a mixture. The mixture was mixed with a spatula, and then stirred at a stirring rate of 800 rpm for 10 to 15 seconds.

In addition, while adding 5 g of a 5 M $H_3PO_4$ aqueous solution to the mixture, stirring was performed at a stirring rate of 800 rpm for 10 to 15 seconds. Then, the mixture was mixed with a spatula, and additionally stirring was performed at a stirring rate of 800 rpm for 10 to 15 seconds. The solid content in the mixture was about 95%.

Then, the mixture was vacuum-dried at 100° C. for 3 hours to obtain a composite material of Example 1.

Comparative Example 1

A composite material of Comparative Example 1 was produced in the same steps as in the steps of producing Example 1 except that, when a 5 M $H_3PO_4$ aqueous solution was added, distilled water was additionally added thereto, and the solid content in the mixture was 60%.

Comparative Example 2

A composite material of Comparative Example 2 was produced in the same steps as in the steps of producing Example 1 except that, when a 5 M $H_3PO_4$ aqueous solution was added, distilled water was additionally added thereto, and the solid content in the mixture was 20%.

Observation of Surface of Composite Material

In the produced composite material of Example 1, it was evaluated whether there was a coating formed on the surface of the positive electrode active material using a scanning electron microscope (SEM) and an analytical instrument based on an EDS analysis method by detecting elemental phosphorus present on the surface of the positive electrode active material. As representative results, FIG. 3A shows an SEM image of Example 1, and FIG. 3B shows an EDS image of elemental phosphorus present on the surface of the positive electrode active material.

As can be clearly understood from FIGS. 3A and 3B, it was confirmed that a coating containing elemental phosphorus was formed in a well-dispersed on the surface of the positive electrode active material of Example 1.

Production of Positive Electrode and Construction of Lithium Ion Secondary Battery for Evaluation Test (Sample Battery)

Each of the composite materials as the positive electrode active material, carbon black as a conductive material, and polyvinylidene fluoride as a binder were weighed out at a mass ratio of 90:9:1, and these were dispersed in NMP to prepare a positive electrode paste.

The positive electrode paste was applied to a positive electrode current collector and vacuum-dried and was then subjected to a rolling step in a press machine, and totally three positive electrode sheets corresponding to the composite materials of Example 1, Comparative Example 1, and Comparative Example 2 were prepared.

Next, a positive electrode produced by punching each of the positive electrode sheets into a 2 $cm^2$ circle and a counter electrode made of metallic lithium were made face to each other with a separator therebetween to construct a sample battery. Regarding an electrolyte solution of the battery, a non-aqueous electrolyte solution in which 1 M $LiPF_6$ was dissolved in a non-aqueous solvent prepared by mixing ethylene carbonate, dimethyl carbonate, and ethyl methyl carbonate at a volume ratio of 3:4:3 was used. Here, a battery using the positive electrode active material on which no coating was formed was prepared as a control battery.

Activation Step (Initial Charging)

The sample battery and the control battery were activated (initially charged).

Specifically, under a temperature condition of −30° C., constant current (CC) charging was performed until a battery voltage reached 4.1 V at a current of 1 C, and constant voltage (CV) charging was then performed until a current value was 1/50 C, and the battery was fully charged. Then, CC discharging was performed until a battery voltage was 3.0 V at a current of 1 C.

Measurement of Reaction Resistance

The above activated batteries were subjected to CC charging at 1 C under a temperature condition of −30° C. and adjusted to a charged state in a state of charge (SOC) of 27%. Then, CC discharging was performed at 10 C for 10 seconds, and an initial battery resistance (IV resistance) was obtained from the slope of the first-order approximation curve of the current (I)-voltage (V) plot value at that time.

Thus, the IV resistance of the sample batteries according to Example 1, Comparative Example 1, and Comparative Example 2 was calculated with respect to 100% of the resistance of the above control battery, as the reaction resistance of the composite material. The results are shown in Table 1 and FIG. 4.

TABLE 1

|  | Solid content (%) | Reaction resistance (%) |
|---|---|---|
| Example 1 | 95 | 88 |
| Comparative Example 1 | 60 | 131 |
| Comparative Example 2 | 20 | 152 |
| Control | — | 100 |

Test Results

As can be clearly understood from Table 1 and FIG. 4, in the sample batteries constructed using each of the composite materials of Example 1, Comparative Example 1, and Comparative Example 2, it was confirmed that the reaction resistance was lower when the solid content in the mixture was lower when the composite material was produced. Thus, the reaction resistance of the sample battery according to Example 1 in which the solid content was 90% or larger was significantly lower than the reaction resistance of the sample battery according to Comparative Example 1 or Comparative Example 2. This indicates that insertion and removal of lithium ions into and from the composite material were favorably performed due to the presence of the coating formed in an amorphous state.

On the other hand, when the mixture was prepared in a state in which the solid content was smaller than 90%, the coating formed on the surface of the positive electrode active material was crystallized. Thereby, since insertion/removal of lithium ions were not efficiently performed, the reaction resistance increased.

Based on the above results, it is thought that, in production of the composite material, the mixture is preferably adjusted to have a solid content of 90% or larger.

While specific examples of the present invention have been described above in detail, these are only examples, and do not limit the scope of the claims. The technologies described in the scope of the claims include various modifications and alternations of the specific examples exemplified above.

Thus, according to the method of producing a composite material for a lithium ion secondary battery disclosed here, it is possible to produce a composite material having excellent lithium ion insertion/removal efficiency, and the composite material is preferable as a positive electrode active material component of a lithium ion secondary battery as a driving power source installed in vehicles such as electric vehicles (EV), hybrid vehicles (HV), and plug-in hybrid vehicles (PHV) for which particularly excellent high-rate input and output characteristics are required.

What is claimed is:

1. A method for producing a composite material comprising a positive electrode active material that is configured for a positive electrode of a lithium ion secondary battery, the method comprising:
   (a) preparing a mixture consisting of a solid component and optionally a solvent, wherein:
      the solid component consists of the positive electrode active material and an inorganic phosphorus compound,
      an amount of the inorganic phosphorus compound is 0.5 mass % or more and 20 mass % or less with respect to 100 mass % of the positive electrode active material,
      a solid content in the mixture is in a range of from 90 mass % to 100 mass % with respect to 100 mass % of the entire mixture, and a remainder, if any, being the solvent, and
      a lithium compound is present on a surface of the positive electrode active material before the preparation of the mixture; and
   (b) stirring the mixture at 400 rpm or higher and lower than 2,000 rpm for a stirring duration of 5 seconds or longer and 5 minutes or shorter, and forming an amorphous coating consisting of lithium phosphate on the surface of the positive electrode active material from at least a part of the lithium compound and the inorganic phosphorus compound,
   wherein the composite material consists of the positive electrode active material and the amorphous coating formed on the surface of the positive electrode active material.

2. The producing method according to claim 1, wherein the lithium compound includes at least one of $Li_2O$ and LiOH.

3. The producing method according to claim 1, wherein the inorganic phosphorus compound includes at least one of $H_3PO_4$, pyrophosphoric acid, and $P_2O_5$.

4. The producing method according to claim 2, wherein the inorganic phosphorus compound includes at least one of $H_3PO_4$, pyrophosphoric acid, and $P_2O_5$.

5. The producing method according to claim 1, wherein the solvent includes at least either water or N-methyl-2-pyrrolidone.

6. The producing method according to claim 2, wherein the solvent includes at least either water or N-methyl-2-pyrrolidone.

7. The producing method according to claim 3, wherein the solvent includes at least either water or N-methyl-2-pyrrolidone.

8. The producing method according to claim 4, wherein the solvent includes at least either water or N-methyl-2-pyrrolidone.

9. The producing method according to claim 1, wherein the lithium phosphate includes at least one of $Li_3PO_4$, $Li_2HPO_4$, and $LiH_2PO_4$.

10. The producing method according to claim 1, wherein the mixture is stirred at a stirring rate of 600 rpm or higher and lower than 2000 rpm.

11. The producing method according to claim 1, wherein the stirring duration is 5 seconds or longer and 30 seconds or shorter.

12. The producing method according to claim 1, wherein the solid content is in a range of from 90 mass % to 95 mass % solids.

* * * * *